United States Patent
Ito

(10) Patent No.: US 9,604,577 B2
(45) Date of Patent: Mar. 28, 2017

(54) FOLDABLE HOLDING DEVICE IN FLOORBOARD

(71) Applicant: Yuzuru Ito, Plymouth, MI (US)

(72) Inventor: Yuzuru Ito, Plymouth, MI (US)

( * ) Notice: Subject to any disclaimer, the term of this patent is extended or adjusted under 35 U.S.C. 154(b) by 0 days.

(21) Appl. No.: 14/690,158

(22) Filed: Apr. 17, 2015

(65) Prior Publication Data

US 2016/0159288 A1 Jun. 9, 2016

Related U.S. Application Data

(60) Provisional application No. 62/088,668, filed on Dec. 7, 2014.

(51) Int. Cl.
 *B60R 7/02* (2006.01)
 *B60R 5/04* (2006.01)

(52) U.S. Cl.
 CPC ............... *B60R 7/02* (2013.01); *B60R 5/04* (2013.01); *B60R 5/045* (2013.01)

(58) Field of Classification Search
 CPC ... B60R 5/04; B60R 5/044; B60R 5/045; B60R 7/02
 USPC .............. 296/24.4, 37.5, 37.14, 37.16
 See application file for complete search history.

(56) References Cited

U.S. PATENT DOCUMENTS

| | | | | |
|---|---|---|---|---|
| 4,091,852 A | * | 5/1978 | Jordan | A45C 11/00 206/522 |
| 6,290,277 B1 | * | 9/2001 | Spykerman | B60R 5/04 224/496 |
| 6,308,873 B1 | * | 10/2001 | Baldas | B60R 7/02 217/15 |
| 7,201,421 B2 | * | 4/2007 | Reynolds | B60R 7/02 224/400 |
| 8,215,693 B2 | * | 7/2012 | Ulita | B60R 5/04 296/37.1 |

(Continued)

FOREIGN PATENT DOCUMENTS

| | | | |
|---|---|---|---|
| DE | 10110335 A1 * | 9/2002 | ............... B60R 5/04 |
| DE | 102012004183 A1 * | 9/2013 | ............... B60R 5/04 |

(Continued)

OTHER PUBLICATIONS

English translation of JP 60-52139; retreived May 9, 2016 from Japan Platform for Patent Information located at https://www.j-platpat.inpit.go.jp/web/all/top/BTmTopEnglishPage.*

*Primary Examiner* — Jason S Daniels
(74) *Attorney, Agent, or Firm* — Harness, Dickey & Pierce, P.L.C.

(57) ABSTRACT

A foldable holding device that is provided in a floorboard, the foldable holding device including: a housing recess that is provided in the floorboard; a top panel that fits into the housing recess, the top panel having a plurality of legs that are continuously and outwardly formed from a lower edge of the top panel, top surfaces of the top panel and the floorboard forming a plane surface when the top panel is housed in the housing recess; a pair of side panels foldably connected to the side edges of the top panel such that when the top panel is raised, the pair of side panels are raised to mutually opposed positions; side panel holding protrusions that are provided in the housing recess; and a plurality of leg-holding members that respectively hold the plurality of legs when the top panel is raised.

14 Claims, 19 Drawing Sheets

(56) References Cited

U.S. PATENT DOCUMENTS

| | | | |
|---|---|---|---|
| 8,789,715 B2* | 7/2014 | Shea | B60R 7/02 |
| | | | 220/4.29 |
| 2015/0175080 A1* | 6/2015 | Kmita | B60R 5/04 |
| | | | 296/37.5 |
| 2016/0229347 A1* | 8/2016 | Warnecke | B60R 13/013 |

FOREIGN PATENT DOCUMENTS

| | | | | |
|---|---|---|---|---|
| FI | DE 10108338 A1 * | 8/2002 | | B60J 7/207 |
| GB | EP 0983902 A2 * | 3/2000 | | B60R 7/02 |
| JP | 60052139 U * | 4/1985 | | |

* cited by examiner

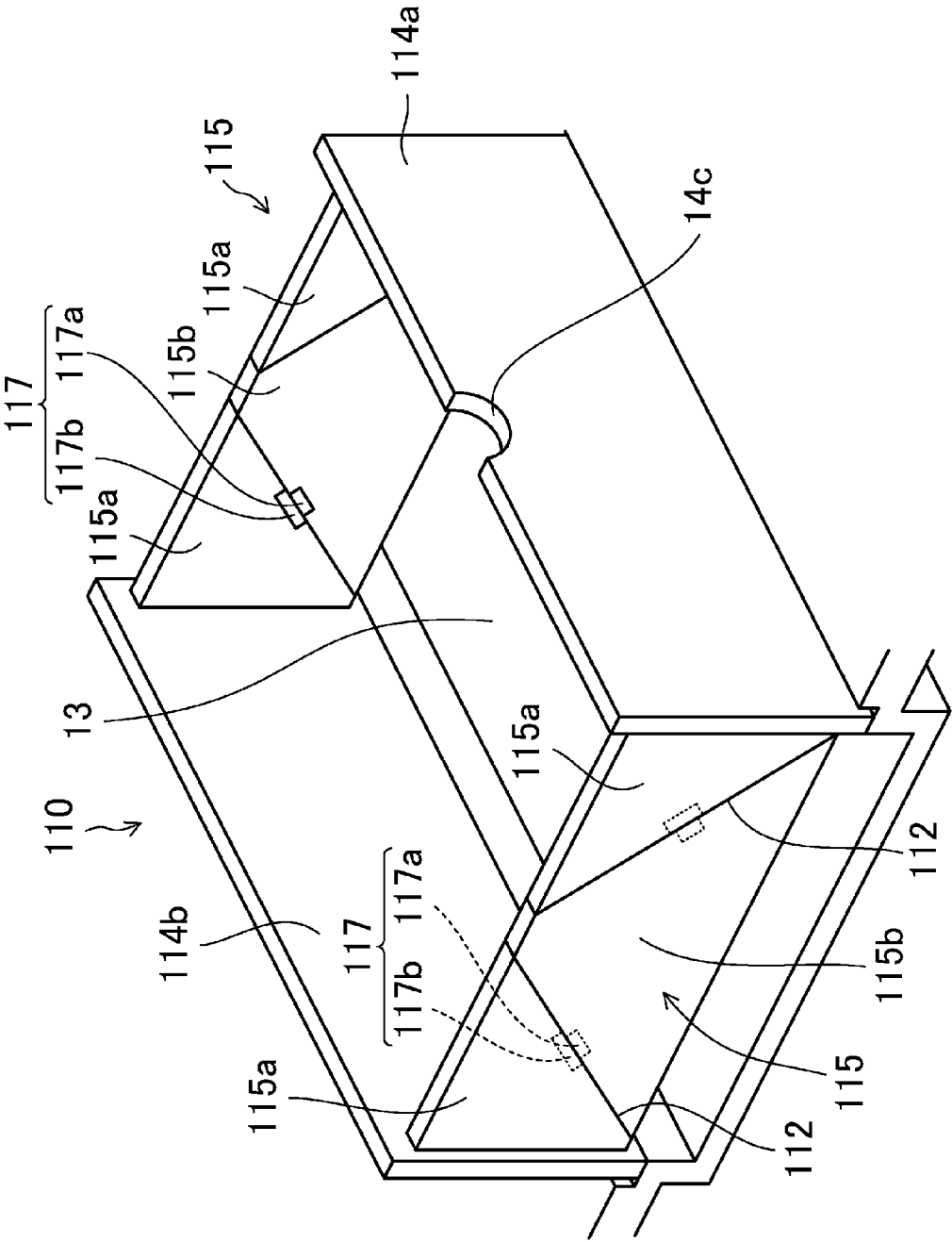

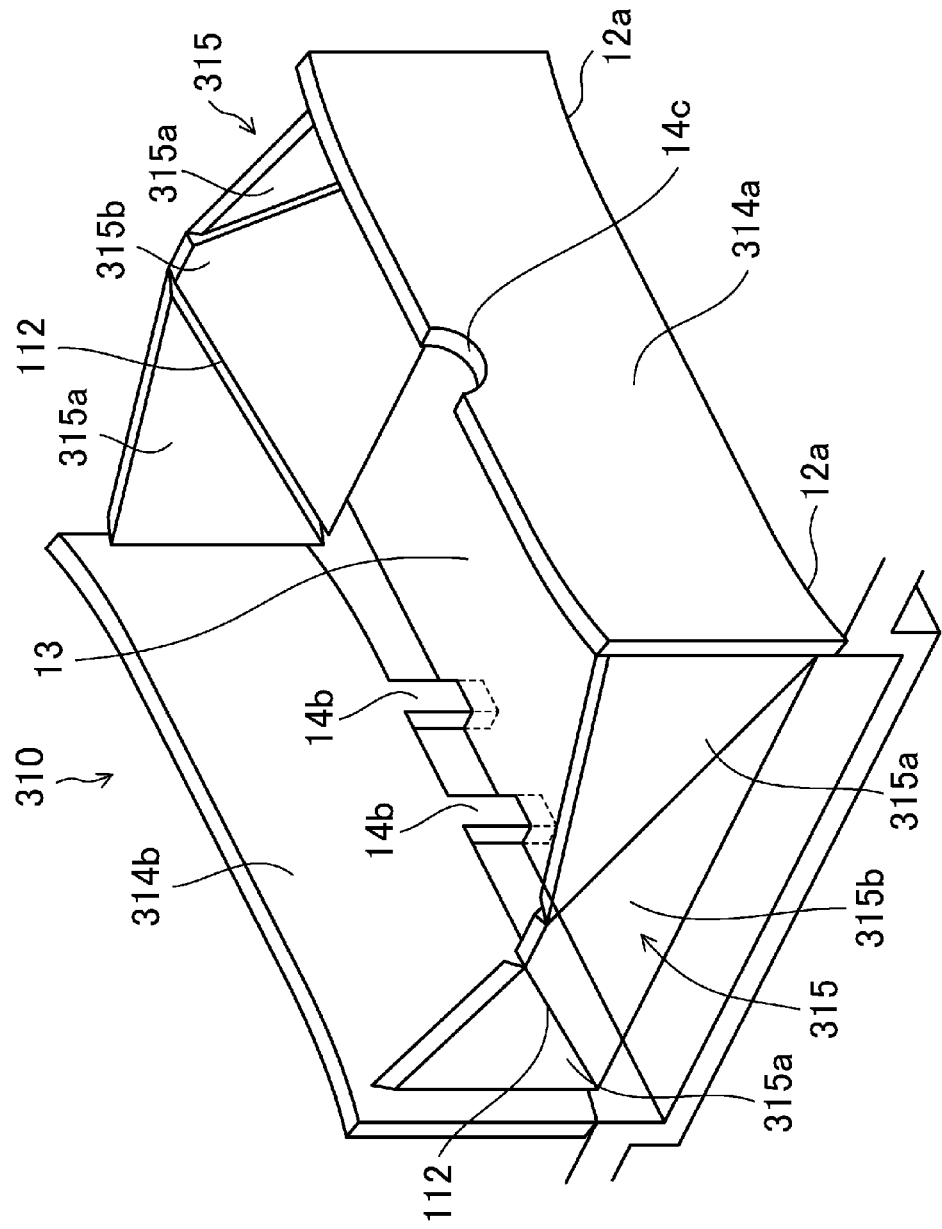

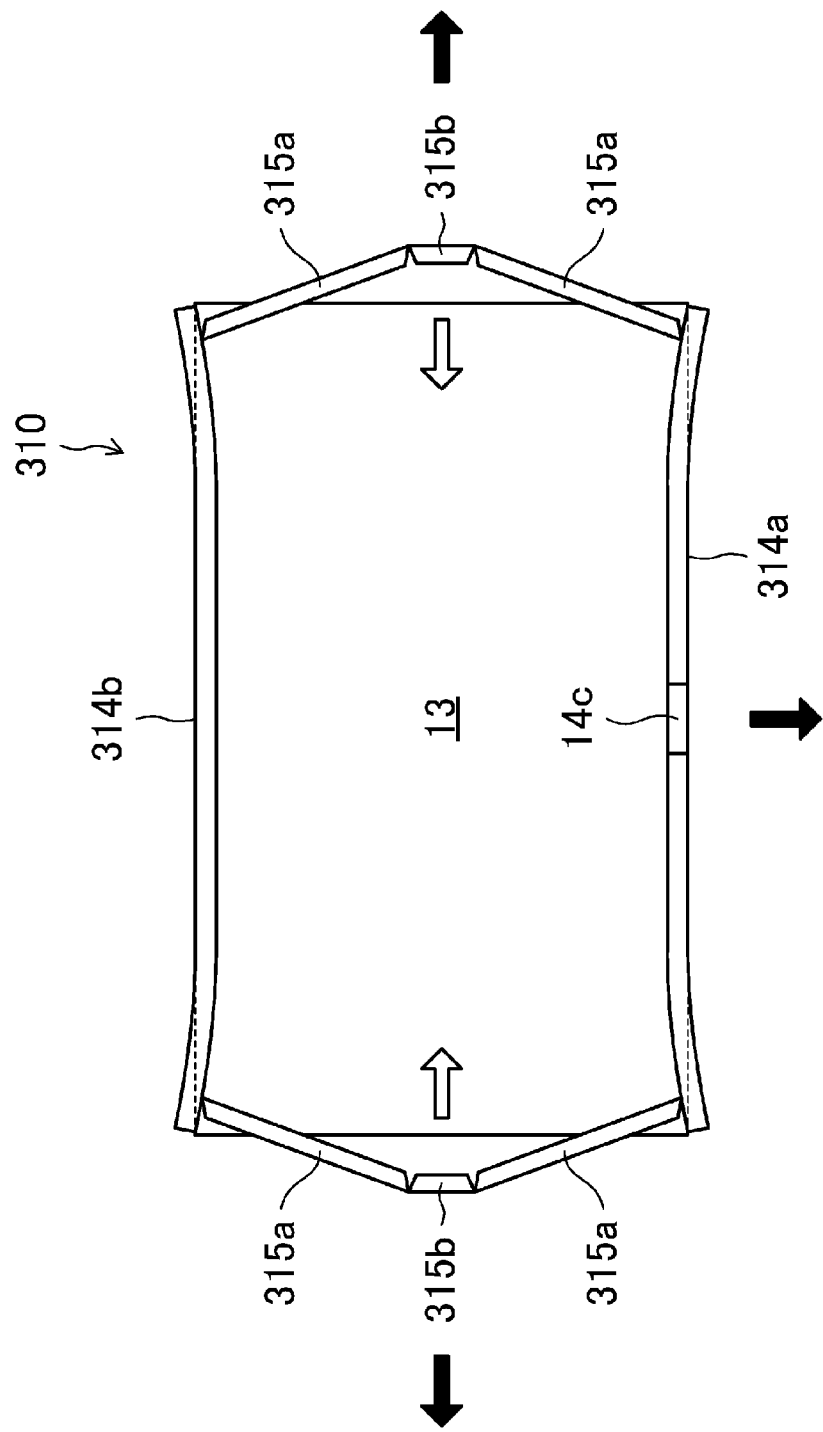

FOLDABLE HOLDING DEVICE IN FLOORBOARD

CROSS-REFERENCE TO RELATED APPLICATION

This application is based upon and claims the benefit of priority from Provisional Patent Application No. 62/088,668, filed on Dec. 7, 2014, the entire contents of both which are incorporated herein by reference in their entirety.

BACKGROUND

The present invention relates to a floorboard used in a luggage compartment and the like having a foldable luggage-holding unit.

Conventionally, as in Japanese Examined Utility Model Publication No. 60-52139, a floorboard having a foldable luggage-holding unit is known in which a rectangular hole is cut out in a carpet body and a box-shaped container is configured in a location facing that hole such that each of the two side edges of the fitted compartment walls is connected by means of flexible material.

BRIEF SUMMARY

However, with the conventional floorboards having a foldable luggage-holding unit the flexible material, although convenient for folding and suitable for storage, when its compartment walls are raised and to form a box-shaped container, its strength is low and a sufficient amount of luggage cannot be held.

On the other hand, when flexible material parts also make up the compartment walls, to maintain the raised position of the four edges of the compartment walls, the adjacent compartment walls must be fastened to each other with hooks or the like, and it becomes bothersome to assemble the walls into a container shape.

The present invention was made while giving full consideration to these points and one of its objects is to provide a luggage-holding unit that is easily raisable into the container-shaped state and that can securely maintain that container-shaped state. In order to achieve that object, the present invention provides a foldable floorboard having a luggage-holding unit comprising:
  a floorboard body to be housed on the floor inside a luggage compartment having a core material and carpet material covering said core material;
  a housing recession in said core material recessed one step below the other areas thereof;
  a raisable top panel that fits into said housing recession when housed;
  a pair of side panels foldably connected to each end of said top panel such that when said top panel is raised the side panels are raised to mutually opposed positions to form, together with said top panel, said luggage-holding unit;
  side panel holding protrusions formed in said housing recession for maintaining the raised position of said pair of side panels after the lower edge of each side panel has passed over its respective protrusion when said side panels are raised; and
  leg-holding points formed in said housing recession into which legs protruding from the lower edges of said top panel fit into when said top panel is raised.

By means of the above-mentioned configuration, when the top panel is raised, the legs of the lower edge of that panel fit into leg-holding points and the pair of side panels also rise, and after their lower edges pass over the side panel holding protrusions, these side panel holding protrusions maintain the container-shaped state.

Also, as another embodiment, the invention provides a foldable floorboard having a luggage-holding unit comprising:
  a floorboard body to be housed on the floor inside a luggage compartment having a core material and carpet material adhesively attached to said core material;
  a housing recession in said core material recessed one step below the other areas thereof;
  a raisable pair of top panels that fit into said housing recession when housed and are supported so they can swing centered on each of the pair of opposing edges; and
  a pair of side panels, each foldably connected to both ends of said pair of top panels, which are raised to mutually opposing positions when said pair of top panels are raised, to form said luggage-holding unit in the shape of a rectangular parallelepiped; wherein said side panels are comprised of:
    a pair of first triangular side panels that are generally triangularly shaped, one edge of each being foldably connected to said pair of top panels; and a second triangular side panel, two edges of which are respectively foldably connected to the other edges of said pair of first triangular side panels and the lower edge of which forms the bottom edge of said side panel;
    the mating surfaces of said first triangular side panels and said second triangular side panels being provided with raised-position support components.

By means of the above-mentioned configuration, when the pair of top panels are pulled up, the pair of side panels connected thereto also open and a luggage-holding unit in the shape of a rectangular parallelepiped is formed. The side panels are formed of a number of foldable triangles and, when raised, raised-position support components maintain the raised position. As a result, the luggage-holding unit readily becomes container-shaped and that container-shaped state is maintained. In addition, the other embodiment mentioned above may also be constructed with the top panel as one panel and the pair of side panels each consisting of one first triangular panel and one second triangular panel.

BRIEF DESCRIPTION OF THE DRAWINGS

FIG. 10 is a perspective view showing the luggage-holding unit according to embodiment 2 in the container-shaped state, with a lateral part cut away;

FIG. 19 is a perspective view showing the luggage-holding unit according to embodiment 4, for the raised position; and FIG. 20 is a plan view showing the luggage-holding unit according to embodiment 4, for the raised position.

DETAILED DESCRIPTION

Embodiments of the present invention are described below, based on the figures.

Embodiment 1

Figure 1:
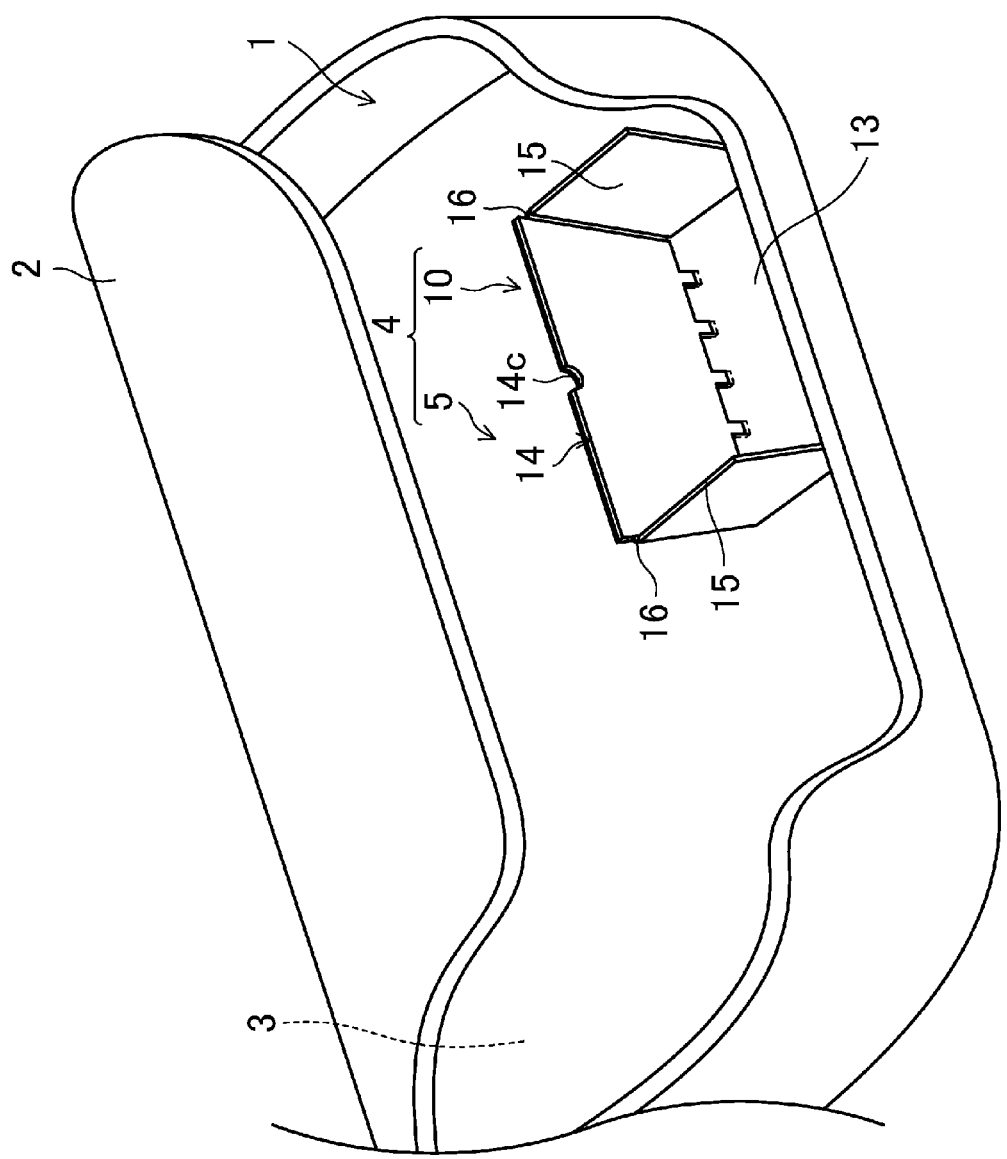
FIG. 1 is a perspective view showing a car trunk with a floorboard having a foldable luggage-holding unit according to embodiment 1 housed in it.

FIG. 1 shows how floorboard 4 is mounted in luggage compartment 1 according to Embodiment 1 of the present invention. For example, this floorboard 4 is positioned so that it can be inserted in and removed from the floor of automobile luggage compartment 1 when its trunk lid 2 is opened. Although not shown in the figure, by lifting floorboard 4, it is possible to remove the spare tire housed in floor 3 which is made, for example, of metal. Furthermore, floorboard 4 need not be made so that it can be inserted/removed, but may be of a fixed type.

Figure 8A:
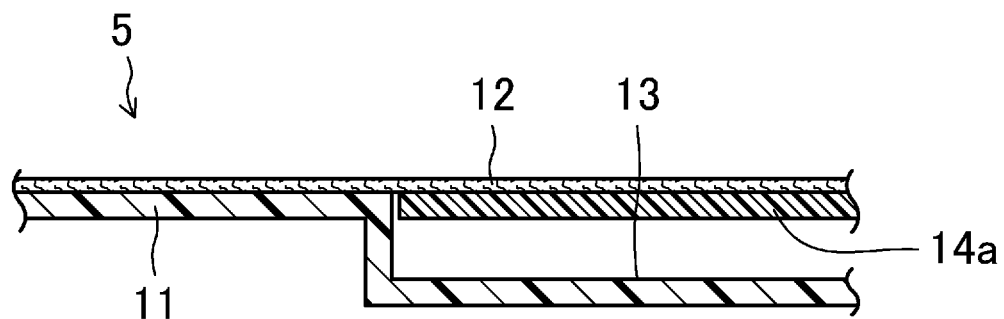
FIG. 8A is an enlarged cross section view showing the housed position along the VIII-VIII line of FIG. 4.

As shown in FIG. 8A, for example, floorboard 4 is made of floorboard body 5 which has core material 11, made from a molded resin component or the like, having carpet material 12 attached to that core material 11. For example, carpet material 12 may be attached with adhesive to core material 11.

Core material 11 is almost sheet-like and is conformed to the shape of luggage compartment 1. At its back edge, for example, housing depression 13 is formed in core material 11 recessed one step below the other areas thereof. Housing depression 13 is, for example, a rectangular shape when viewed from above. The bottom of housing depression 13 may be exposed core material 11 or may be covered in carpet material 12.

Figure 2:
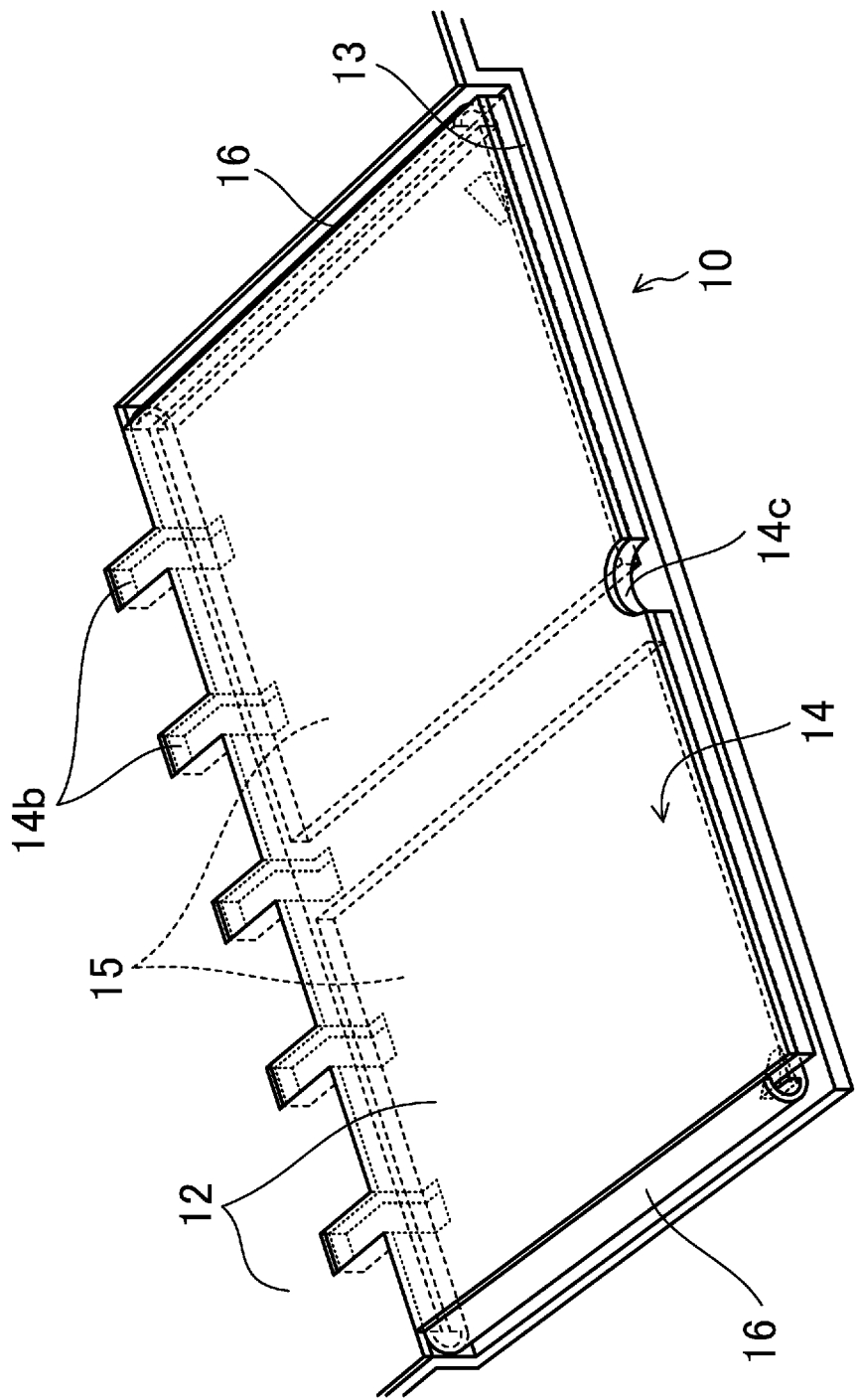
FIG. 2 is a perspective view showing the housed position of the luggage-holding unit with a lateral part cut away.
Figure 3:
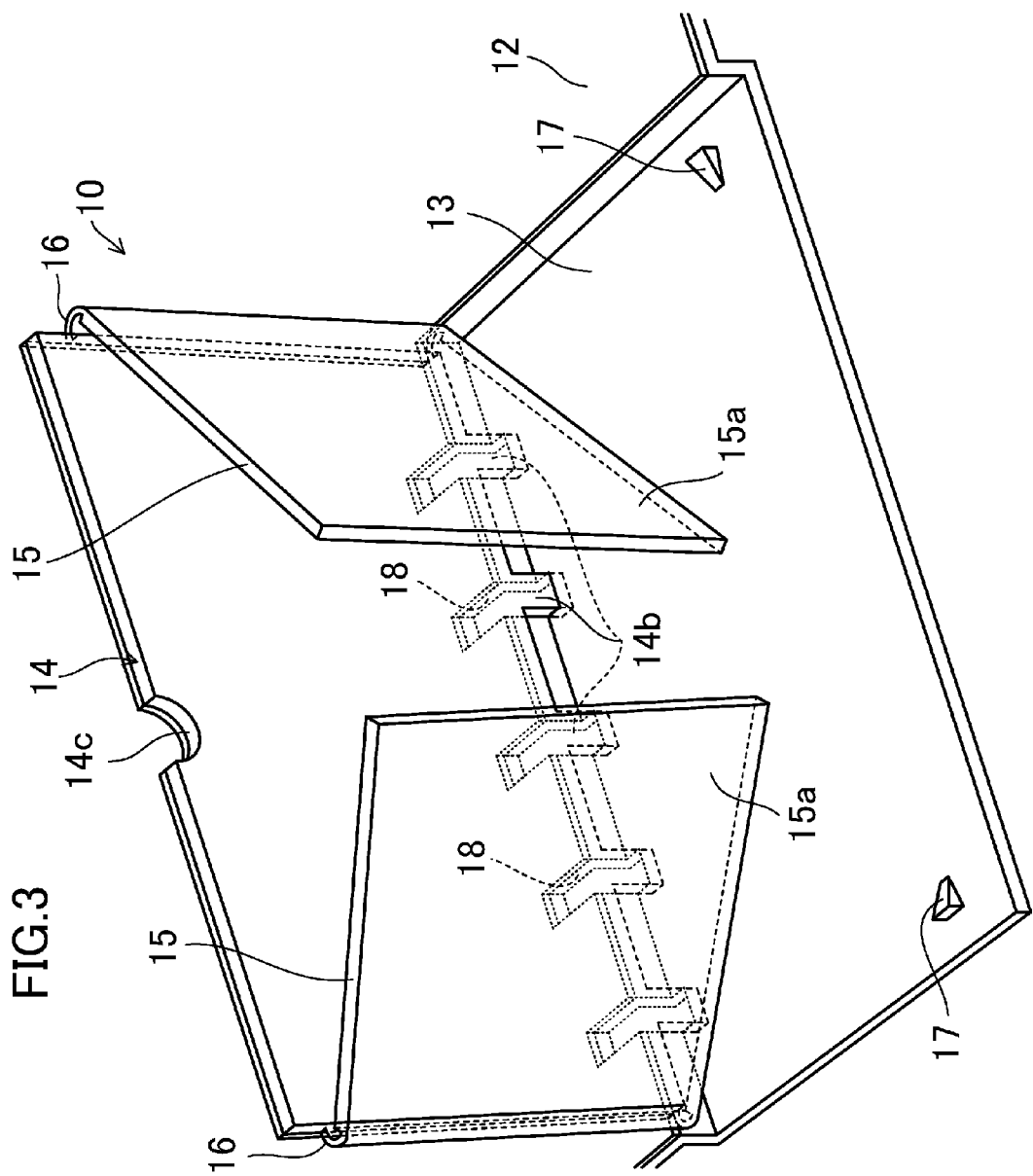
FIG. 3 is a perspective view showing the luggage-holding unit while being raised, with a lateral part cut away.
Figure 4:
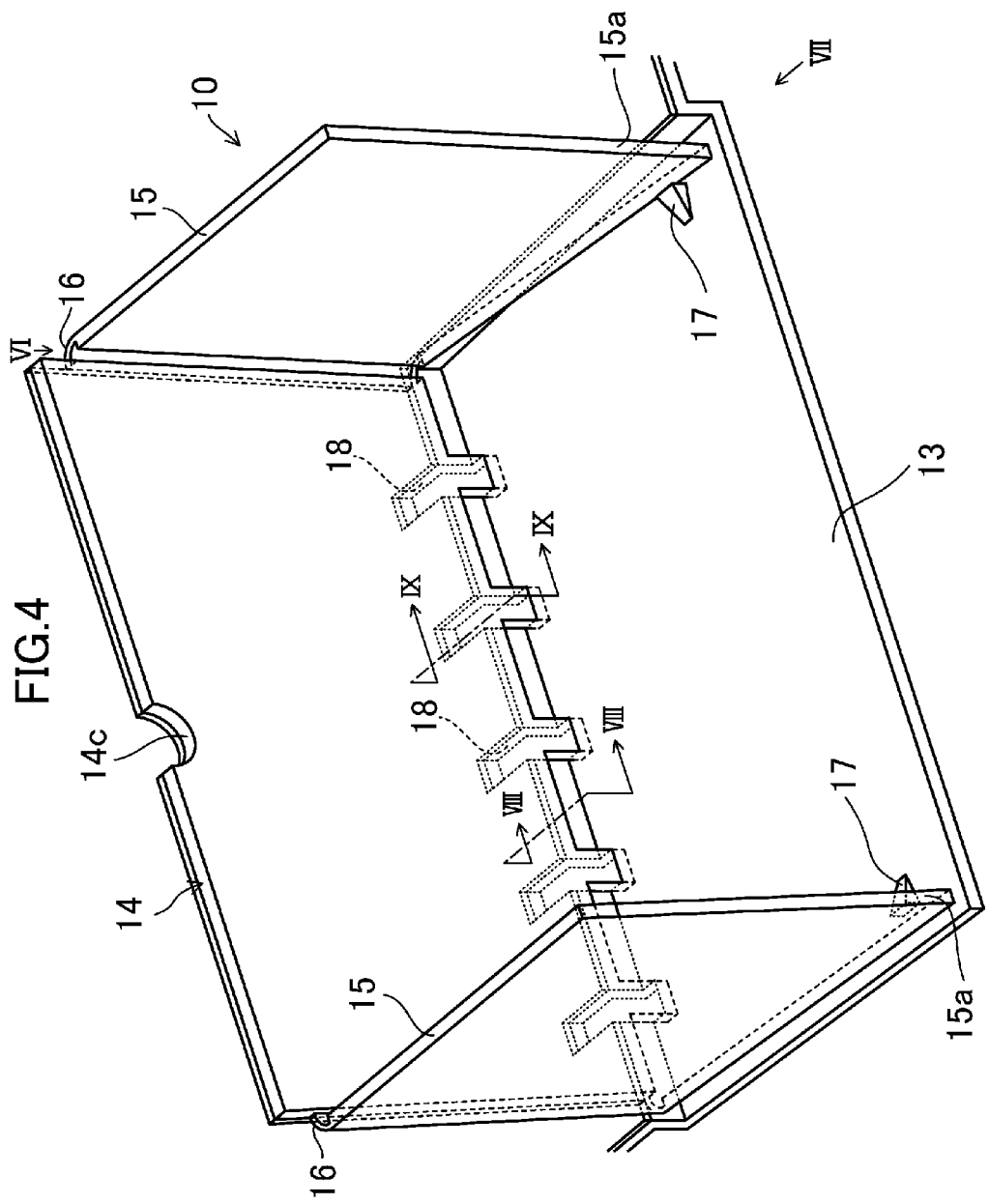
FIG. 4 is a perspective view showing the luggage-holding unit in the container-shaped state, with a lateral part cut away.

Floorboard 4 is provided with luggage-holding unit 10 which can be folded into housing depression 13. Specifically, as shown in FIG. 2 through FIG. 4, this housing depression 13 is normally covered by raisable top panel 14, which is generally in the shape of a rectangular flat panel. Top panel 14 has rigid core material 14a of the same material as core material 11, and the surface side of this rigid core material 14a is covered by carpet material 12. Top panel 14 is formed so that several legs 14b extend from its lower edge (when closed, the forward edge). There is no particular limit on the number of legs 14b. Also, on the upper edge (when closed, the rear edge) of top panel 14, finger-hold point 14c, cut out in an arc-like shape, is provided to enable a finger to be inserted.

In addition, a pair of side panels 15 are foldably connected at both ends of top panel 14 respectively. Pair of side panels 15 are formed, for example, of the same rigid material 14a as top panel 14 and are connected integrally to top panel 14 by flexible hinges 16 of this rigid material 14a thinly formed. If pair of side panels 15 is also covered by carpet material 12, hinges 16 may also be covered by carpet material 12. When top panel 14 is raised, this pair of side panels 15 are also raised to positions mutually opposing each other and together with top panel 14 form luggage-holding unit 10.

Figure 7A:
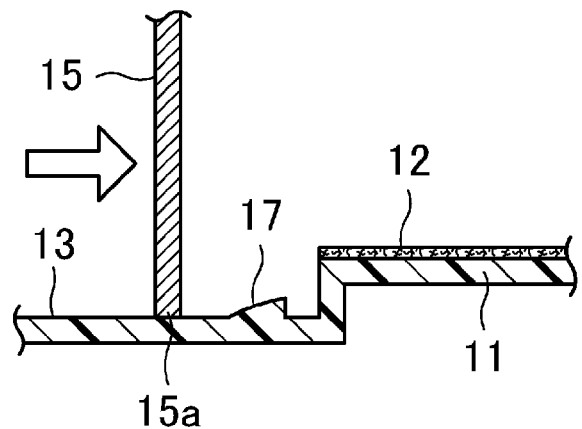
FIG. 7A is cross section view from the direction of arrow VII of FIG. 4 showing the state in which a side panel has not yet reached the side panel holding protrusion.

Also, as shown in FIG. 7A, at the right and left in the bottom of housing depression 13, side-panel holding protrusions 17 are provided to leave a space so that when the pair of side panels 15 are raised, after the lower edge 15a of each side panel 15 passes over the respective protrusion, these side panels 15 will be held in the raised position. Side-panel holding protrusions 17 are preferably barb-shaped, for example, so that after the pair of side panels 15 pass over them, the lower edges 15a of side panels 15 catch on them and are retained. The lower edges 15a are pinched between these side-panel holding protrusions 17 and the side walls of housing depression 13, and become stabilized.

Figure 9A:
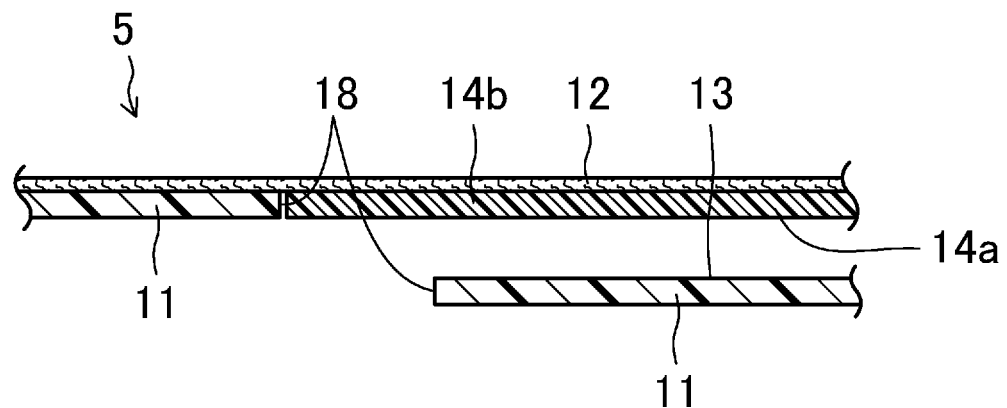
FIG. 9A is an enlarged cross section view showing the housed position along the IX-IX line of FIG. 4.
Figure 9B:
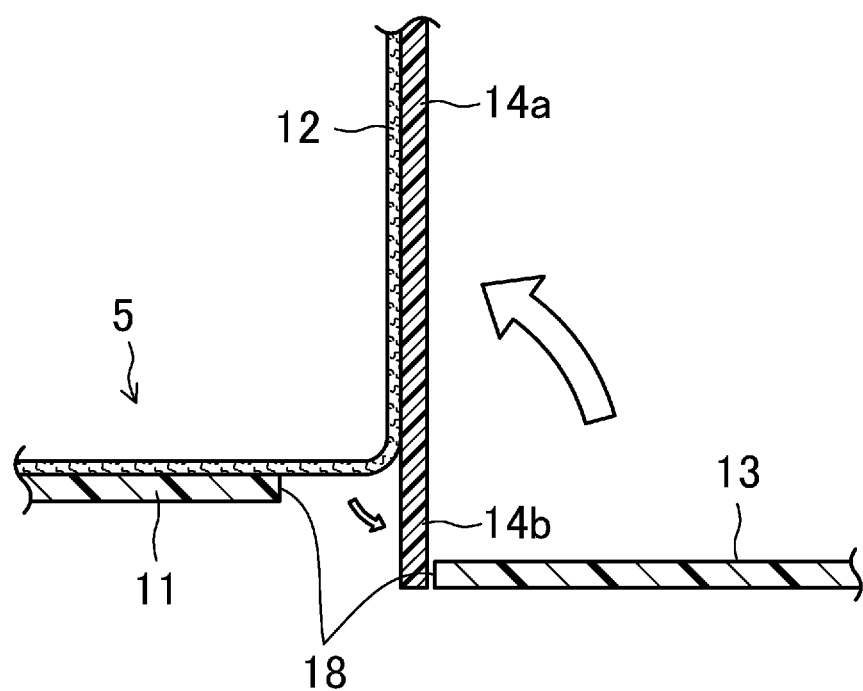
FIG. 9B is an enlarged cross section view showing the raised position along the IX-IX line of FIG. 4.

In addition, as shown in FIG. 3 and FIG. 9B, leg-holding points 18 are provided at the front-edge side of housing depression 13 into which legs 14b protruding from the lower edge of top panel 14 fit when top panel 14 is raised. These leg-holding points 18 consist for example of a plurality of thru-holes or depressions with bottoms provided in locations corresponding to legs 14b.

Figure 5:
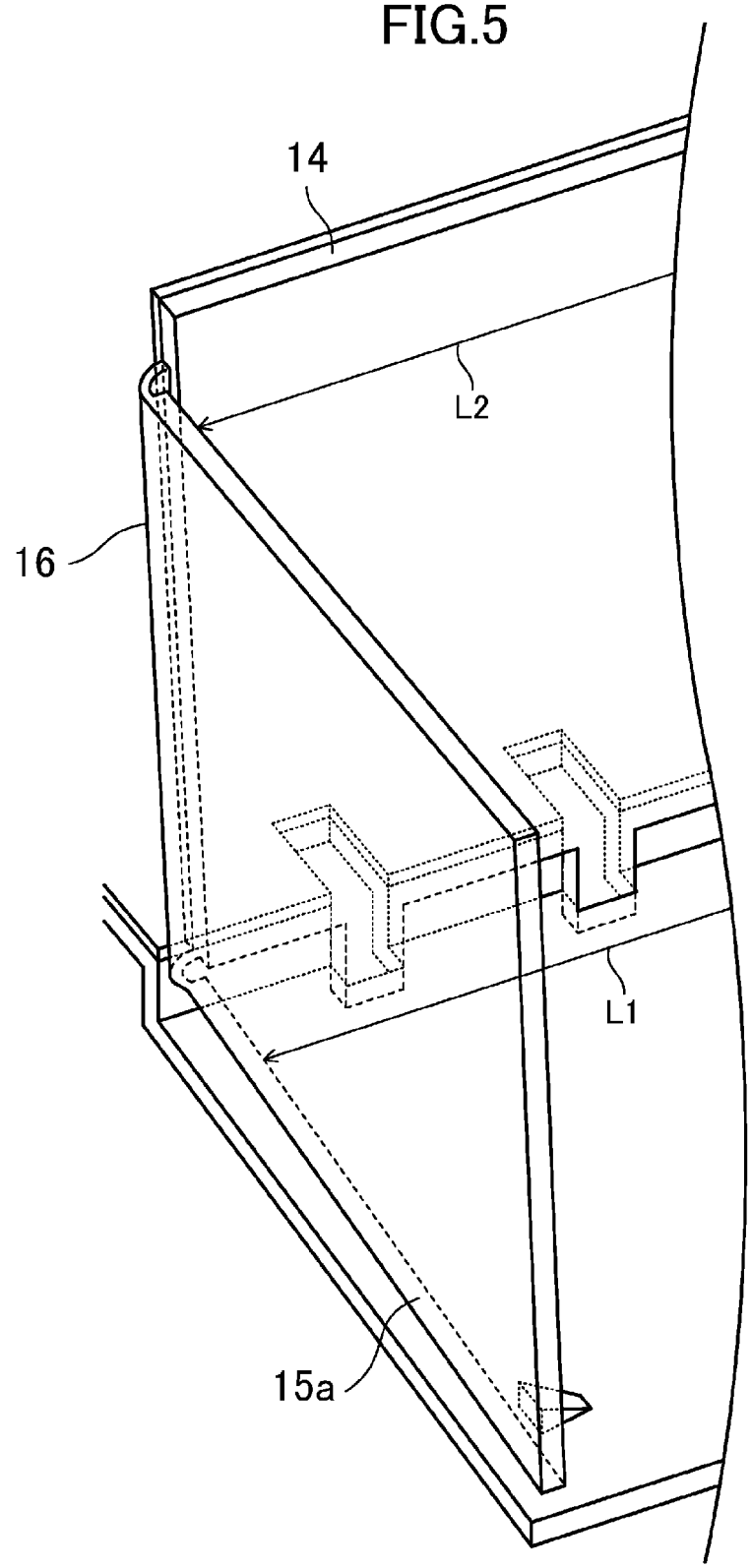
FIG. 5 is an enlarged perspective view showing the case of the top panel and the side panels connected at a slant, with a lateral part cut away.
Figure 6A:
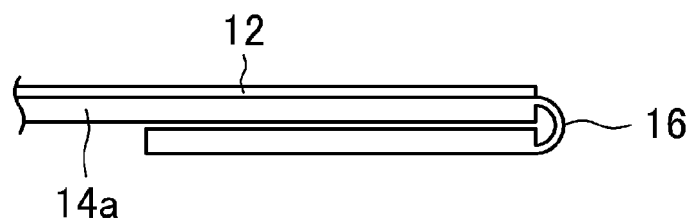
FIG. 6A is a view of the closed position from the direction of arrow VI in FIG. 4.
Figure 6B:
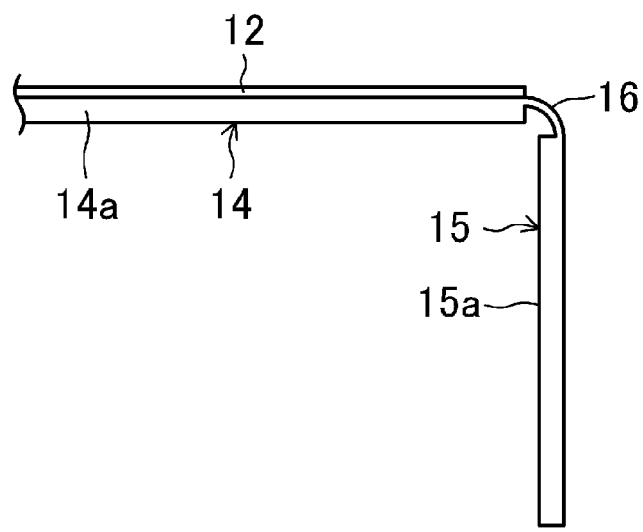
FIG. 6B is a view of the container-shaped state from the direction of arrow VI in FIG. 4.
Figure 6C:
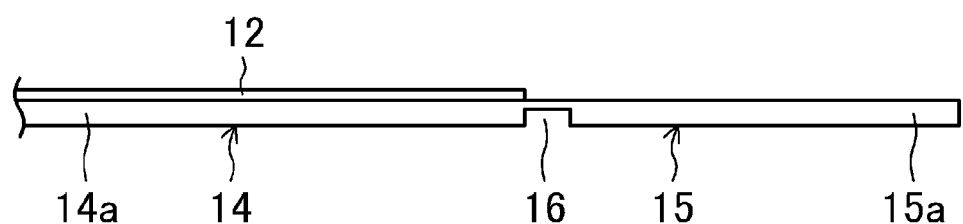
FIG. 6C is a view of the open position from the direction of arrow VI in FIG. 4.

Furthermore, as shown in FIG. 5, the pair of side panels 15 may be connected at a slant relative to top panel 14 when raised, so that the left-right distance L2 between the upper edges of side panels 15 is longer than left-right distance L1 between lower edges 15a of side panels 15. In that way, top panel 14 becomes a trapezoid, with its upper edge longer than its lower edge. When the pair of side panels open up as the top panel is raised, it is preferable that the more the lower edges 15a of the pair of side panels 15 move backward, the more strongly they press on housing depression 13 and their locking strength with side-panel holding protrusions 17 is enhanced.

Next will be described the use procedure for floorboard 4 having a foldable luggage-holding unit 10, according to the present embodiment.

In the housed position shown in FIGS. 2, 6A, 8A and 9A, the pair of side panels 15 are underneath top panel 14 and are held down by the weight of top panel 14 itself, so that a flat state is maintained. The surface of top panel 14 is covered with carpet material 12 so that its surface is generally at the same height as the surrounding surfaces which, in addition to presenting an attractive appearance, makes it difficult for luggage to snag when luggage is being loaded or unloaded. In addition, by minimizing the depth of housing depression 13, in some cases a depression will not have to be created in the floor below it. Indeed, vehicle design benefits because the thickness of floorboard 4 can be kept as thin as possible.

Next, when top panel 14 is to be raised as in FIG. 3, a finger is applied to finger-hold point 14c and the panel is pulled upward. By doing that, the pair of side panels 15 connected by hinges 16 are gradually raised. At this point, as mentioned above, if the pair of side panels 15 are connected at a slant relative to top panel 14, as they move toward the back, they will press more strongly on housing depression 13.

Figure 7B:
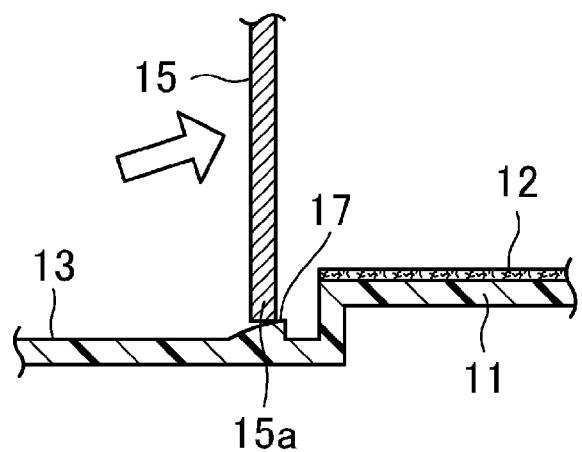
FIG. 7B is cross section view from the direction of arrow VII of FIG. 4 showing the state in which a side panel is riding up the side panel holding protrusion.

Then, from FIG. 7A to FIG. 7B, it is preferable that hinges 16 expand automatically under the force pushing them back to their original positions. To avoid cases where raising cannot be completed, hinges 16 may be configured as mechanical hinges including an elastic component such as a spring or rubber.

Figure 7C:
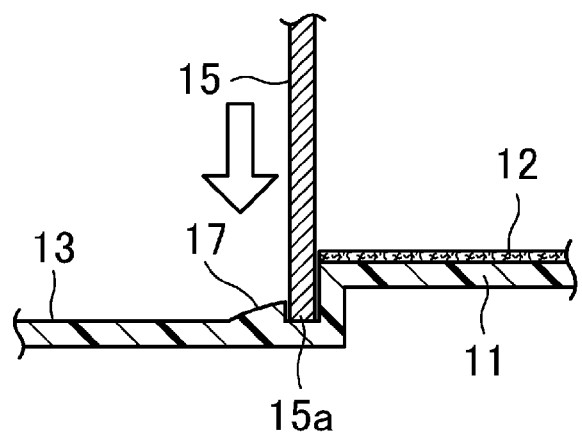
FIG. 7C is cross section view from the direction of arrow VII of FIG. 4 showing the state in which a side panel has passed over the side panel holding protrusion.

Next, as shown in FIG. 7C, when lower edges 15a of side panels 15 have passed over side-panel holding protrusions 17, the edges catch on the barb-shaped parts of side-panel holding protrusions 17 and are pinched between these side-panel holding protrusions 17 and the side walls of housing depression 13, and are locked.

Figure 8B:
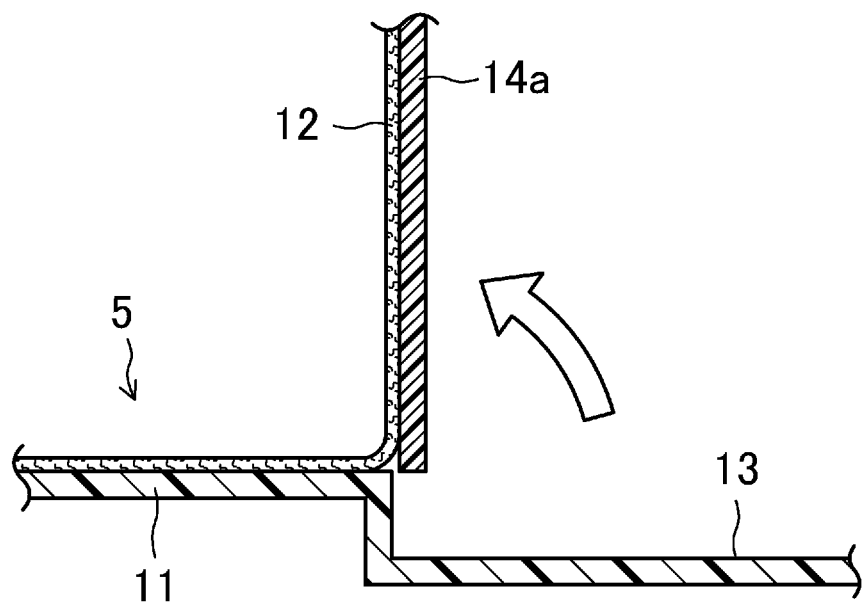
FIG. 8B is an enlarged cross section view showing the raised position along the VIII-VIII line of FIG. 4.

Likewise, as shown in FIGS. 8B and 9B, top panel 14 is raised to 90° and legs 14b on its lower edge fit into leg-holding points 18. In this way, the open position is maintained. If luggage housed in the luggage-holding unit 10 should move forward and come into contact with top panel 14, legs 14b contact the side surfaces of leg-holding points 18, so top panel 14 is prevented from falling forward. Also, the pair of side panels 15 are made with rigid material 14a, not the flexible material used in the past, so it is difficult to knock them over even if a force is applied to them from the housed luggage. In addition, even if the weight of luggage or the like is applied from above, it is hard to knock them over, compared to when flexible material is used.

When closing luggage-holding unit 10, one raises the back end sides of the pair of side panels 15 with both hands so that their lower edges pass over side-panel holding protrusions 17. After that, the pair of side panels 15 closes due to the weight of top panel 14 itself, and it returns to the closed position.

In this way, the parts configuration of floorboard 4 is extremely simple and can be constructed simply by attaching carpet material to the existing rigid material and adding one part (luggage-holding unit 10) thereto.

In addition, operation is extremely simple: it can be made so that it can be opened by a one-step operation with one hand and that open position can be maintained. Moreover, as mentioned above, it can be closed by a one-step operation of lifting the back end sides of the pair of side panels with both hands, and that closed position can be maintained.

Consequently, by means of floorboard 4 having a foldable luggage-holding unit 10 according to this embodiment, luggage-holding unit 10 can be readily raised to the container-shaped state and that container-shaped state can also be securely held.

Embodiment 2

FIGS. 10 through 15 show luggage-holding unit 110 according to Embodiment 2 of the present invention, which differs from above mentioned Embodiment 1 in that its form is different. That said, in each of the following embodiments, for components that are the same as in FIG. 1 through FIG. 9, the same code numbers are assigned, but a detailed description of each is omitted.

Figure 11:
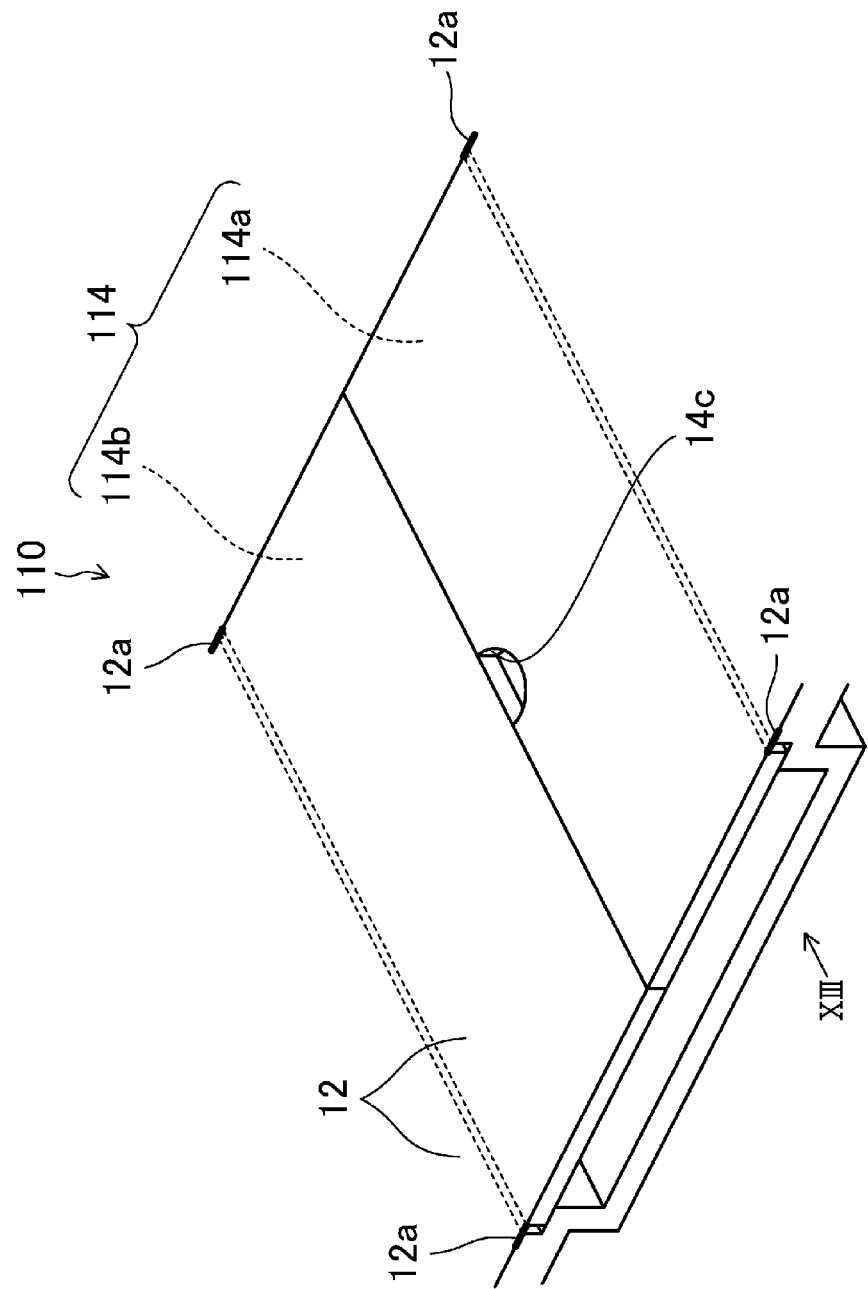
FIG. 11 is a perspective view showing the luggage-holding unit in the housed position, with a lateral part cut away.

In this embodiment, top panel 114 consists of raisable first top panel 114a and raisable second top panel 114b, each of which is supported so that it can swing centered on one of the pair of opposing edges (corresponding to the front and back edges of housing depression 13). First top panel 114a and second top panel 114b form a flat top panel 114 when luggage holding unit 110 is in the folded position. The surface of top panel 114 is covered with the same carpet material as the surrounding area, so it presents an attractive appearance. As shown in FIG. 11, if carpet material 12 is provided with slits 12a, opening and closing of top panel 114 can be done smoothly.

The pair of side panels 115 are foldably connected to both ends of first top panel 114a and second top panel 114 b. The pair of side panels 115 are formed of a light-weight sheet-like material with comparatively high stiffness such as a molded resin component or the like of thickness of roughly 12 mm, for example. When first top panel 114a and second top panel 114b are raised, they are raised into mutually opposing positions and together with top panel 114 form luggage-holding unit 110 in the shape of a rectangular parallelepiped.

Figure 13:
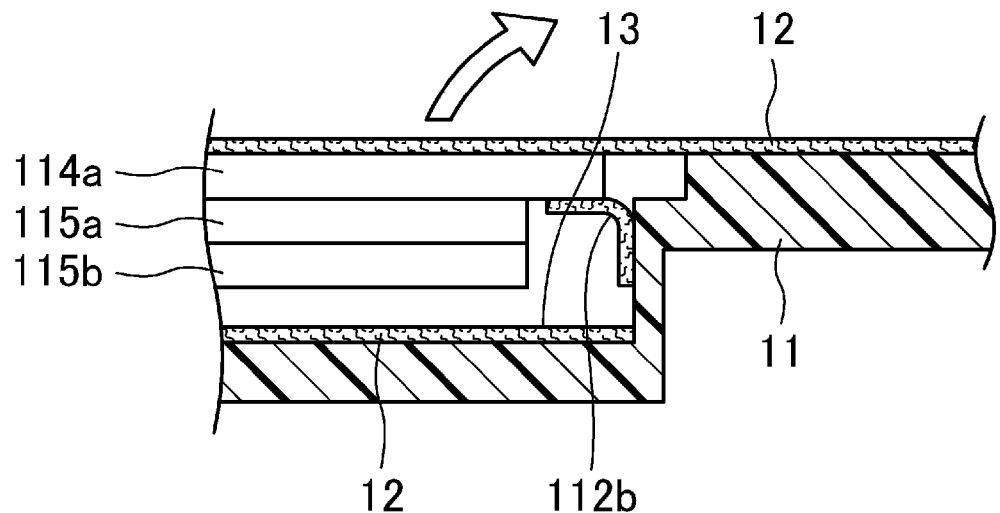
FIG. 13 is an enlarged detail view from the direction of arrow XIII in FIG. 11.
Figure 14:
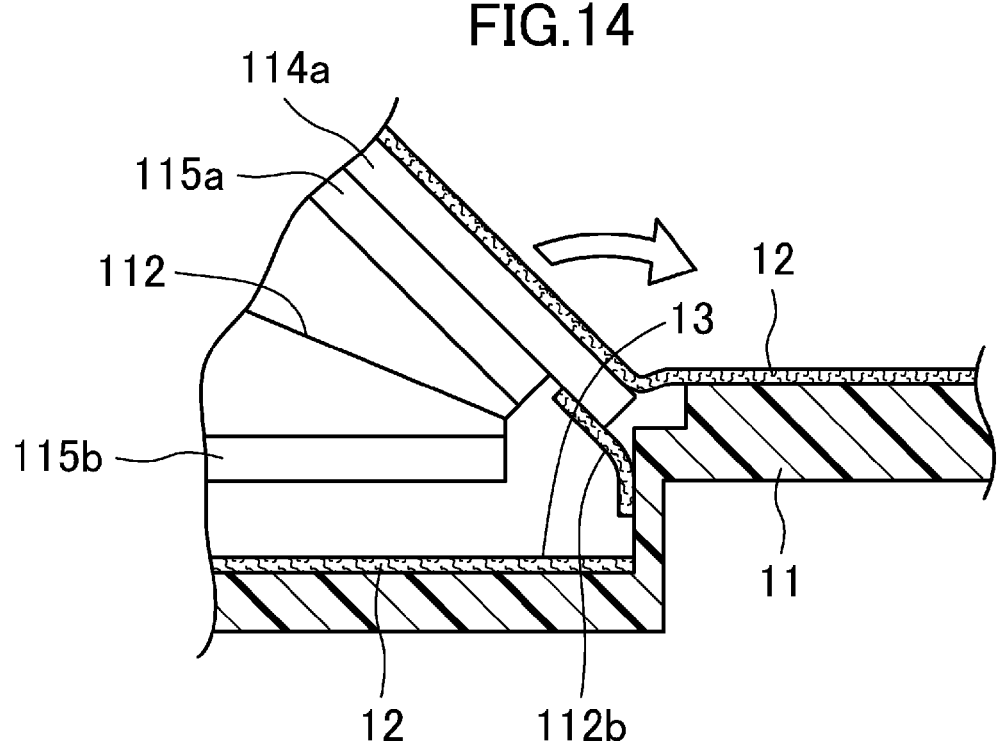
FIG. 14 is a view that corresponds to FIG. 13 for the partly raised state.
Figure 15:
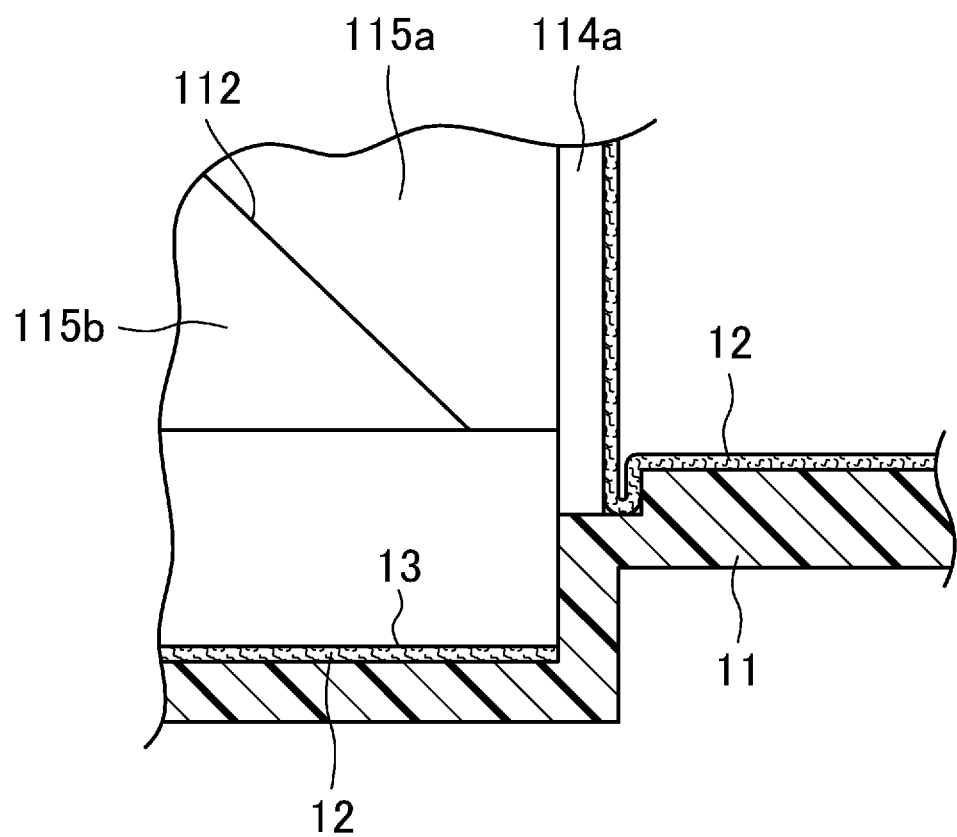
FIG. 15 is a view that corresponds to FIG. 13 for the raised position.

Side panels 115 are each made of a pair of first triangular side panels 115a, each roughly triangular shaped, and foldably attached to an edge of first top panel 114a and second top panel 114 b. In the present embodiment each first triangular side panel 115a is formed of a flat panel of roughly right-triangle shape. As shown in the figure, this includes a corner being cut off to form a trapezoidal shape. To each sloped edge of these pairs of first triangular side panels 115a, a second triangular side panel 115b is foldably connected. Second triangular side panel 115b consists of, for example, an almost isosceles triangle with its tip flattened. It is configured so that in the raised position its lower edge becomes the lower edge of side panel 115. In addition, the pair of first triangular side panels 115a, second triangular side panels 115b, and pair of top panels 114 are foldably connected to each other by flexible fabric components 112. There is no particular limitation upon the fabric components, but they are made of flexible and durable sheet plastic, etc. and at least the left and right outer side surfaces of the areas where they are mutually connected should be covered. Also, for example, the entire left and right outer-side side surfaces and the areas where they are connected to top panel 114a and top panel 114b may be covered. Furthermore, as shown in FIG. 13 and FIG. 14, the areas where first top panel 114a and second top panel 114b are connected to the side walls of housing depression 13 are also connected by a supplemental supplementary fabric material 112b on the side opposite to carpet material 12.

At the surfaces where first triangular side panels 115a and second triangular side panel 115b mate, raised-position support components 117 are provided. These raised-position support components 117 consist, for example, of magnet 117a and magnet-attractable fitting 117b which is made of a metal such as iron that is attracted to the magnet. The magnet-attractable fitting 117b may be constructed of a magnet or an assembly of magnets and metal components.

Magnet 117a and magnet-attractable fitting 117b may be insert-molded into the respective mating surfaces of first triangular side panel 115a and second triangular side panel 115b leaving them exposed, or they may be fitted into depressions formed in the mating surfaces. Moreover, these raised-position support components 117 may also be positioned at the mating surfaces of first triangular side panel 115a and first top panel 114a or second top panel 114b.

Next will be described the use procedure for floorboard 4 having a foldable luggage-holding unit 110, according to the present embodiment.

In the housed position shown in FIG. 11, the pair of side panels 115 are under top panel 114 as shown in FIG. 13 and are held down by the weight of top panel 114 so that a flat state is maintained. The surface of top panel 114 is covered with carpet material 12 so that its surface is generally at the same height as the surrounding surfaces which, in addition to presenting an attractive appearance, makes it difficult for luggage to snag when luggage is being loaded or unloaded. In the present embodiment also, by minimizing the depth of housing depression 13, in some cases a depression will not have to be created in the floor below it. Indeed, vehicle design benefits because the thickness of floorboard 4 can be kept as thin as possible.

Figure 12:
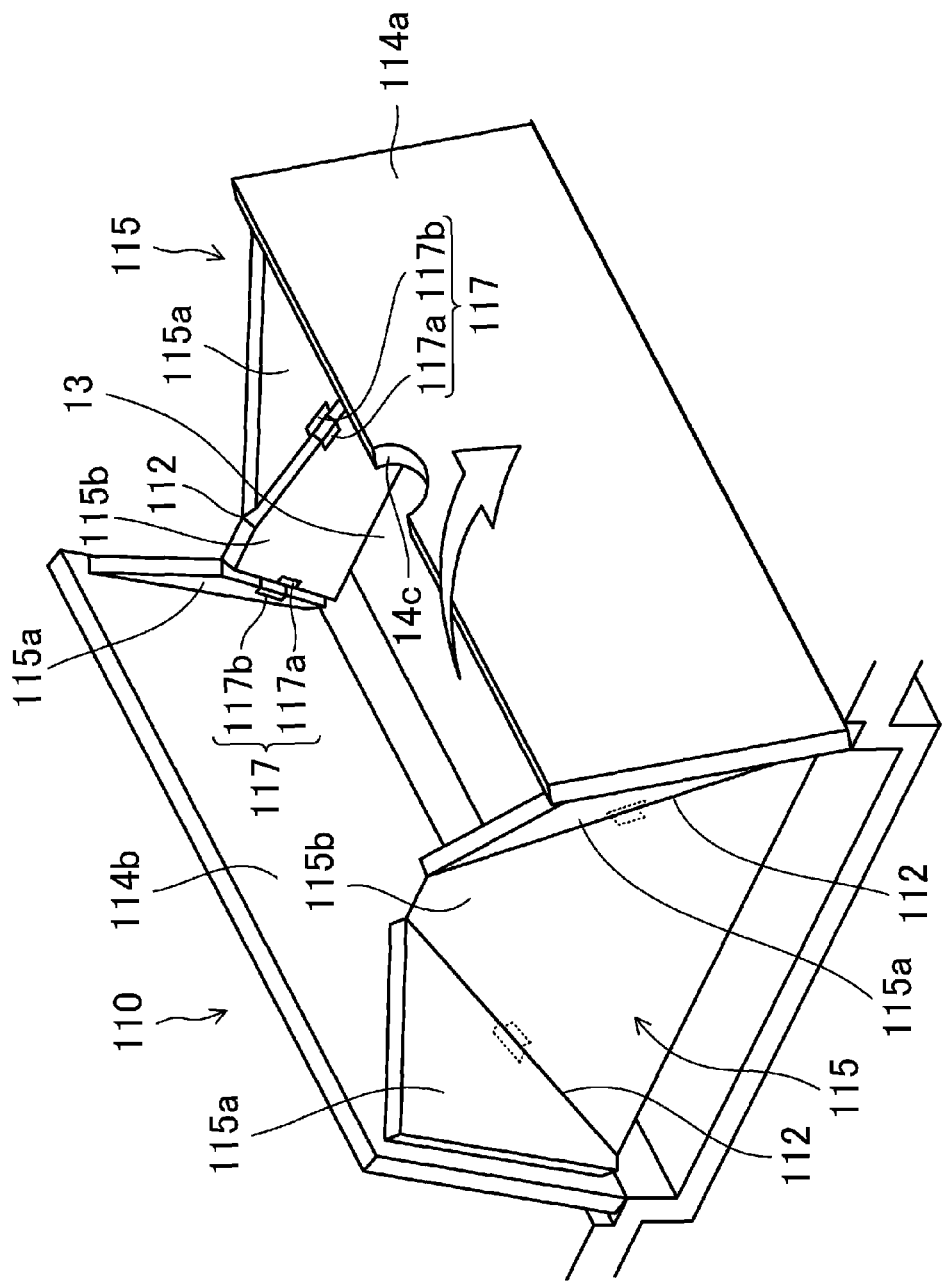
FIG. 12 is a perspective view showing the luggage-holding unit partly raised, with a lateral part cut away.

Next, when top panel 114 is to be raised as in FIG. 12, a finger is applied to finger-hold point 14c and the panel is pulled upward. By doing that, as shown in FIG. 14, first triangular side panels 115a which are connected to first top panel 114a by means of fabric components 112 are pulled up and as a result, second top panel 114b on the opposite side is also gradually raised.

It is preferable that by pulling up first top panel 114a, second top panel 114b on the opposite side is also completely raised, but if cannot be fully raised, one may grip second top panel 114b in one's hand and pull it up.

When this is done, as shown in FIG. 12, magnet 117a and magnet-attractable fitting 117b are pulled together by magnetic force, and almost automatically, by means of magnetic force, each side panel 115 rises to become one flat panel. This position is maintained by the magnetic force.

In this way, upon opening the unit by pulling up first top panel 114a, the pair of side panels 115 connected to it and the second top panel 114b also open and, working together, form a luggage-holding unit in the form of a rectangular parallelepiped. Each side panel 115 is formed of three foldable triangles and, when raised, the raised position is maintained by raised-position support components 117. As a result, the luggage-holding unit 110 readily becomes container shaped and that container-shaped state is maintained.

In reverse, when closing, one simultaneously pushes the pair of side panels 115 downward and inward. On the other hand, it is made so that even if an unintended force is applied to only one of the side panels 115, it will not close.

Consequently, with a floorboard 4 having a foldable luggage-holding unit 110 according to this embodiment also, luggage-holding unit 110 can be readily raised to the container-shaped state and that container-shaped state can also be securely held.

Embodiment 3

Figure 16:
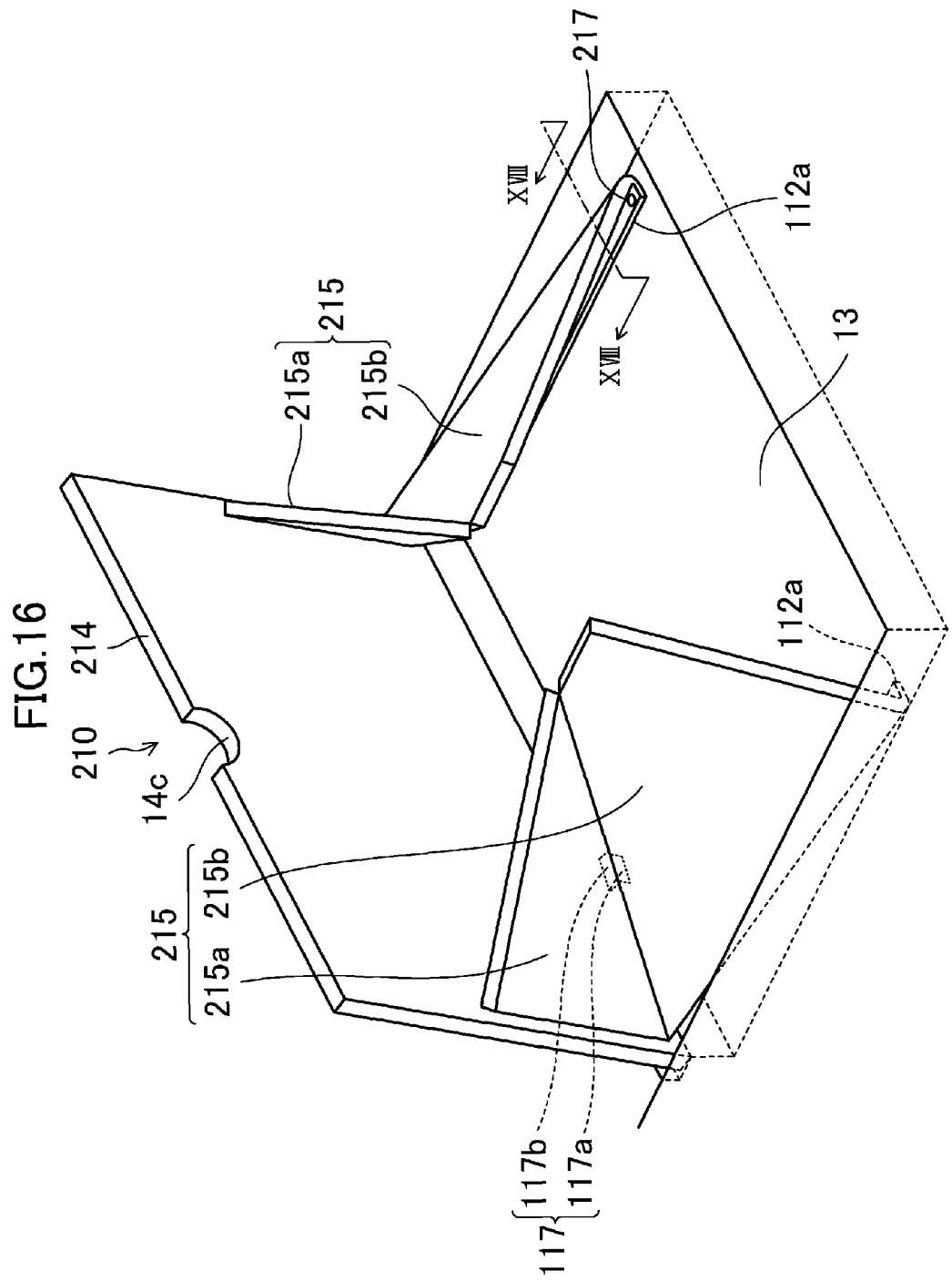
FIG. 16 is a perspective view showing the luggage-holding unit according to embodiment 3, for the partly raised state.
Figure 17:
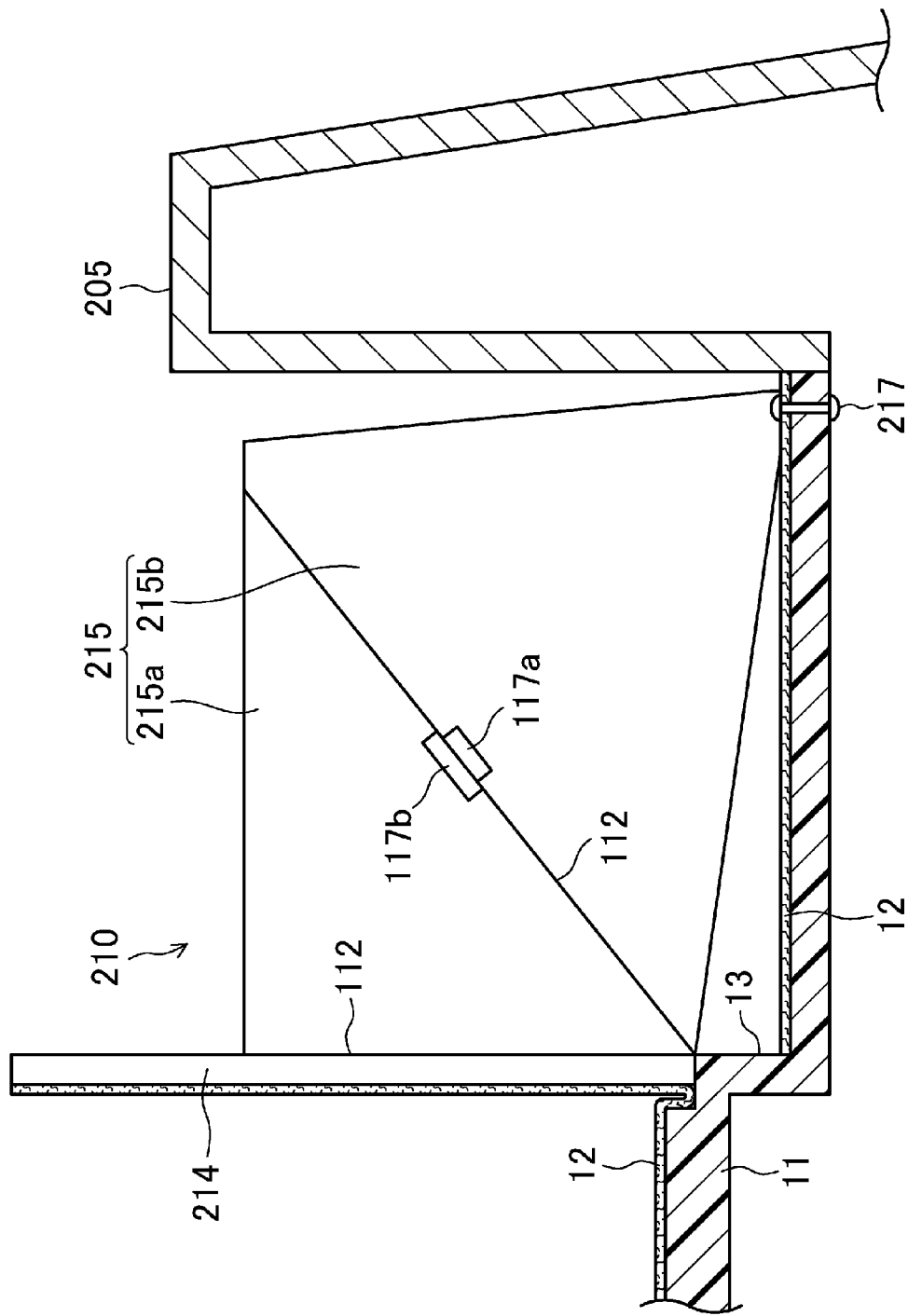
FIG. 17 is a cross section view showing the luggage-holding unit in the raised position.
Figure 18:
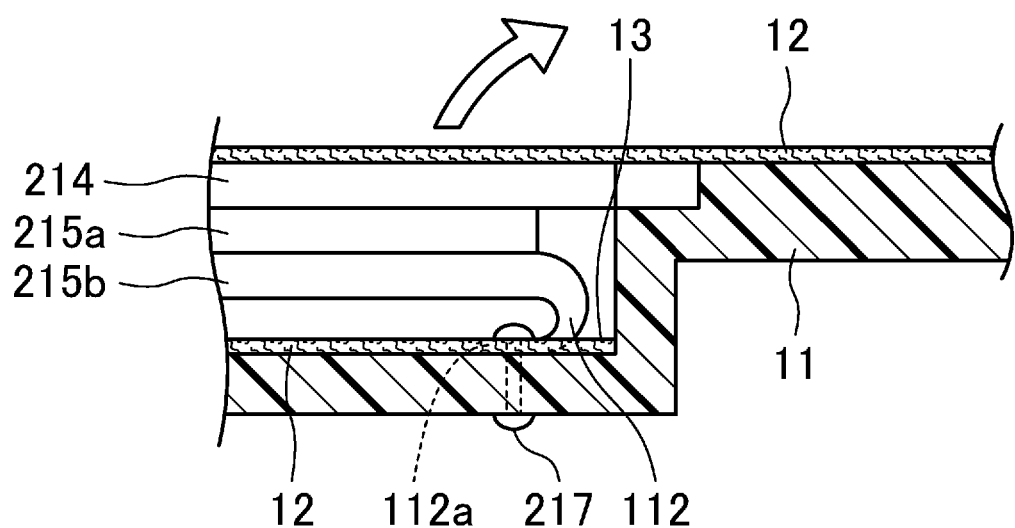
FIG. 18 is an enlarged cross section view along the XVIII-XVIII line of FIG. 16.

FIG. 16 through FIG. 18 show luggage-holding unit 210 according to Embodiment 3 of the present invention, which differs from above mentioned Embodiment 1 and Embodiment 2 in that its form is different.

In this embodiment, top panel 214 consists of a 1-panel top panel 214, similar to the above-mentioned Embodiment 1. And at both ends of top panel 214, the pair of side panels 215 are respectively foldably connected. This pair of side panels 215 are formed of a light-weight sheet-like material with comparatively high stiffness such as a resin-molded component or the like, for example, and when top panel 214 is raised, they are raised into mutually opposing positions and, working together with top panel 214 and trunk rear wall 205, form luggage-holding unit 210 in the shape of a rectangular parallelepiped.

Side panels 215 are foldably connected to one edge of top panel 214, and consist of generally triangularly shaped first triangular side panels 215a. In the present configuration, each first triangular side panel 215a is formed of a flat panel of roughly right-triangle shape. To each sloped edge of these first triangular side panels 215a, a second triangular side panel 215b is foldably connected. Second triangular side panels 215b consist of trapezoidal shaped panels, for example, configured so that in the raised position the lower edge of each becomes the lower edge of side panel 115.

In addition, first triangular side panels 215a, second triangular side panels 215b, and top panel 214, are foldably connected to each other by flexible fabric components 112.

At the surfaces where first triangular side panels 215a and second triangular side panels 215b mate, raised-position support components 117 are provided.

One end 112a of fabric components 112 is affixed to the bottom floor of housing depression 13 by means of screws 217. In this manner, the pair of side panels 215, when in the raised position, cannot be removed from housing depression 13. The method of affixing that one end 112a is not limited to the use of screw 117.

Next will be described the use procedure for floorboard 4 having a foldable luggage-holding unit 210, according to the present embodiment.

Although not shown in the figures, in the housed position the pair of side panels 215 are underneath top panel 214 and are held down by the weight of top panel 214 itself, so that a flat state is maintained.

Next, when top panel 214 is to be raised as in FIG. 16, a finger is applied to finger-hold point 14c and the panel is pulled upward. By doing that, first triangular side panels 215a which are connected to top panel 214 by means of fabric components 112 are pulled up and as a result, second triangular side panels 215b are also gradually raised.

When this is done, as shown in FIG. 17, magnet 117a and magnet-attractable fitting 117b are pulled together by magnetic force, and almost automatically, by means of magnetic force, the pair of side panels 215 rise, each becoming a flat panel. This position is maintained by the magnetic force. Moreover, in the present embodiment, these raised-position support components 117 may also be provided at the mating surfaces of first triangular side panels 215a and top panel 214.

In this way, upon opening the unit by pulling up top panel 214, the pair of side panels 215 connected to it also open and, working together with the trunk rear wall 205, form a luggage-holding unit 210 in the form of a rectangular parallelepiped. Each side panel 215 is formed of two foldable triangles and, when raised, the raised position is maintained by raised-position support components 117. As a result, the luggage-holding unit 210 readily becomes container shaped and that container-shaped state is maintained.

In reverse, when closing, one simultaneously pushes the pair of side panels 215 downward and inward. On the other hand, it is made so that even if an unintended force is applied to only one of the side panels 215, it will not close.

Consequently, with a floorboard 4 having a foldable luggage-holding unit 210 according to this embodiment also, luggage-holding unit 210 can be readily raised to the container-shaped state and that container-shaped state can also be securely held.

Embodiment 4

FIG. 19 and FIG. 20 show luggage-holding unit 310 according to Embodiment 3 of the present invention, which differs from above mentioned Embodiment 2 in that the configuration for supporting the raised position is different.

In other words, the basic configuration is generally the same as Embodiment 2, but with the present embodiment, only in the center areas of the lower ends of first top panel 314a and second top panel 314b two legs 14b are provided for example, similar to above-mentioned Embodiment 1. First top panel 314a and second top panel 314b have a sheet thickness on the order of from 5 mm to 7 mm, so that they can bow to a moderate extent.

In addition, side panels 315 are not provided with magnets 117a and magnet-attractable fittings 117b, but instead the pair of first triangular side panels 315a and second side panels 315b which constitute side panels 315 when raised (when in the container-shaped state) have a dimensional relationship so that they bow to the outer sides of the left and right side edges of housing depression 13. In other words, it is configured so that, by means of side panels 315 bowing greatly to the outside when they are raised, the container-shaped state is maintained by means of fabric components 112 which are stretched (they become the raised-position support components). In the carpet material 12, slits 12a are provided, and it is made so that both sides of first top panel 314a and second top panel 314b bow to a moderate extent and so that their lower edges can ride over the surface of floorboard 4.

With this embodiment, because raised-position support components are not provided, as shown by the black arrows in FIG. 20, after first top panel is raised, as the next step it is necessary to push side panels 315 outwardly to the left and right using both hands.

When housing the unit, if side panels 315 at right and left are folded inward using both hands as shown by the outlined arrows in FIG. 20, fabric components 112 begin to return to their original positions and by the operation of the weight of first top panel 314a and second top panel 314b themselves the unit returns to the housed position. It is made so that even if an unintended force is applied to only one of the side panels 315, it will not close.

With the present embodiment, raised-position support components 117 are not provided, so there are the advantages that the parts count is reduced and one can spread out side panels 315 at one's own pace.

Consequently, with a floorboard 4 having a foldable luggage-holding unit 310 according to this embodiment also, luggage-holding unit 310 can be readily raised to the container-shaped state and that container-shaped state can also be securely held.

Other Embodiments

With the above-mentioned embodiments, the following configurations may also be done.

That is, with each of the above-mentioned embodiments, top panel 14, 114, 214 and first top panel 314a and second top panel 314b are connected to the areas surrounding housing depression 13 of floorboard 4 by means of carpet material 12, but they may also be connected by mechanical hinges provided with an elastic component such as a spring or rubber and they may even be connected by both of those.

In addition, with each of the above-mentioned embodiments, luggage-holding unit 10, 110, 210 and 310 are configured with a pair of side panels 15, 115, 215, or 315, but if housing depression 13 is provided in a position near one of the sidewalls, either left or right, of luggage compartment 1, for example, it can be configured of only one, left or right, of side panels 15, 115, 215, or 315.

Also, with above-mentioned Embodiment 1, hinges 16 are formed of a thin layer of core material 14a, but they can be configured of hinges provided with an elastic component such as a spring or rubber. Furthermore, they can be formed of carpet material 12 or of flexible fabric material 112. In that case, when opening, the pair of side panels 15 are moved by hand and are made to pass over side-panel holding protrusions 17. Configuration of hinges 16 is not limited to these examples, but also may be done with flexible material such as tape.

Furthermore, the above embodiments are in essence preferred examples, and are in no way intended to limit the scope of the present invention, the articles it is applied to, or its application.

The scope of the invention, therefore, should be determined solely by the following claims.

What is claimed is:

1. A foldable holding device that is provided in a floorboard of a luggage compartment, the foldable holding device comprising:
    a housing recess that is provided in the floorboard;
    a raisable top panel that fits into the housing recess while the raisable top panel is housed in the housing recess, the raisable top panel having an upper edge, a lower edge and side edges, the raisable top panel having a plurality of legs that are continuously and outwardly formed from the lower edge so that a top surface of the raisable top panel, a top surface of the plurality of legs and a top surface of the floorboard form a planar surface while the raisable top panel is housed in the housing recess;
    a pair of side panels foldably connected to at least one of the side edges of the raisable top panel such that as the raisable top panel is raised, the pair of side panels move to mutually opposed positions to form, together with the raisable top panel, the foldable holding device in an open state;
    side panel holding protrusions that are provided in the housing recess and maintain a raised position of the pair of side panels; and
    a plurality of leg-holding members that are provided in the housing recess and that respectively hold the plurality of legs as the raisable top panel is raised,
    wherein the pair of side panels, when opened, are connected at a slant to the raisable top panel so that a first shortest distance between upper edges of the pair of side panels is longer than a second shortest distance between lower edges of the pair of side panels.

2. The foldable holding device according to claim 1,
    wherein the raisable top panel is formed by a rigid core material and a fabric material fixed to the rigid core material, and
    the pair of side panels are formed of the same rigid core material as the raisable top panel and are integrally connected to the raisable top panel by living hinges formed of a thinned part of the rigid core material.

3. The foldable holding device according to claim 1, wherein the pair of side panels are connected to the raisable top panel by flexible fabric components.

4. The foldable holding device according to claim 1, wherein the pair of side panels are connected to both of the side edges of the raisable top panel, respectively.

5. A foldable holding device that is provided in a floorboard of a luggage compartment, the foldable holding device comprising:
 a housing recess that is provided in the floorboard;
 a raisable pair of top panels that fit into the housing recess while the raisable pair of top panels are housed in the housing recess, each lower edge of the raisable pair of top panels being swingably supported by the floorboard so that the raisable pair of top panels stand when the raisable pair of top panels are outwardly opened from top edges of the raisable pair of top panels, each of the raisable pair of top panels having side edges connected between the top and lower edges; and
 a pair of side panels respectively and foldably connected to at least one of the side edges of each of the raisable pair of top panels so that as the raisable pair of top panels are raised, the pair of side panels move to mutually opposing positions to form the holding device into a rectangular parallelepiped shape in a plan view,
 wherein one of the pair of side panels is configured with:
  a first pair of triangular side panels that are generally triangularly shaped, a first edge of each of the first pair of triangular side panels being foldably connected to one of the side edges of each of the raisable pair of top panels, respectively;
  a second triangular side panel, two edges of the second triangular side panel being respectively and foldably connected to two of second edges of the first pair of triangular side panels, and a lower edge of the second triangular side panel forms a lower edge of each of the pair of side panels; and
  mating surfaces of the first pair of triangular side panels and the second triangular side panel being provided with raised-position support components, and
 wherein the raised-position support components are magnets and magnet-attractable fittings.

6. The foldable holding device according to claim 5, wherein the first pair of triangular side panels, the second triangular side panel, and at least one of the side edges of each of the raisable pair of top panels are connected to each other by flexible fabric components so that the first pair of triangular side panels, the second triangular side panel, and the raisable pair of top panels fold relative to each other.

7. The foldable holding device according to claim 5, wherein four of the first edges of the first pair of triangular side panels of the pair of side panels are connected to four of the side edges of the raisable pair of top panels, respectively.

8. A foldable holding device that is provided in a floorboard of a luggage compartment, the foldable holding device comprising:
 a housing recess that is provided in the floorboard;
 a raisable top panel that fits into the housing recess while the raisable top panel is housed in the housing recess, a lower edge of the raisable top panel being swingably supported by the floorboard so that the raisable top panel stands as the raisable top panel is outwardly opened from a top edge of the raisable top panel, the raisable top panel having side edges connected between the top and lower edges; and
 a pair of side panels foldably connected to at least one of the side edges of the raisable top panel such that as the raisable top panel is raised, the pair of side panels move to mutually opposed positions to form, together with the raisable top panel, the foldable holding device in an open state,
 wherein one of the pair of side panels is configured with:
  a first triangular side panel that is generally triangularly shaped, and a first edge of the first triangular side panel being foldably connected to the one of the side edges of the raisable top panel; and
  a second triangular side panel, one edge of the second triangular side panel is foldably connected to a second edge of the first triangular side panel, a lower edge of the second triangular side panel forms a lower edge of each of the pair of side panels;
  mating surfaces of the first triangular side panel and the second triangular side panel being provided with raised-position support components, and
 wherein the raised-position support components are a magnet and a magnet-attractable fitting.

9. The foldable holding device according to claim 8, wherein the first triangular side panel and the raisable top panel are connected by a flexible fabric component so that the first triangular side panel and the raisable top panel fold relative to each other.

10. The foldable holding device according to claim 8, wherein two of the first edges of the first triangular side panels of the pair of side panels are connected to two of the side edges of the raisable top panel, respectively.

11. A foldable holding device that is provided in a floorboard of a luggage compartment, the foldable holding device comprising:
 a housing recess that is provided in the floorboard;
 a raisable pair of top panels that fit into the housing recess while the raisable pair of top panels are housed in the housing recess, each of lower edges of the raisable pair of top panels being swingably supported by the floorboard so that the raisable pair of top panels stand as the raisable pair of top panels are outwardly opened from top edges of the raisable pair of top panels, each of the raisable pair of top panels having side edges connected between the top and lower edges; and
 a pair of side panels foldably connected to at least one of the side edges of the raisable pair of top panels so that as the raisable pair of top panels are raised, the pair of side panels move to mutually opposing positions to form the holding device into a rectangular parallelepiped shape in a plan view,
 wherein one of the pair of side panels is configured with:
  a first pair of triangular side panels that are generally triangularly shaped, a first edge of each of the first pair of triangular side panels being foldably connected to one of the side edges of each of the raisable pair of top panels, respectively;
  a second triangular side panel, two edges of the second triangular side panel being respectively and foldably connected to two of second edges of the first pair of triangular side panels, and a lower edge of the second triangular side panel forms a lower edge of each of the pair of side panels; and
  mating surfaces of the first pair of triangular side panels and the second triangular side panel being fitted with raised-position support components, and wherein the raised-position support components are flexible components so that when the raisable pair of top panels are raised, the pair of side panels are outwardly bowed.

12. The foldable holding device according to claim 11, wherein four of the first edges of the first pair of triangular side panels of the pair of side panels are connected to four of the side edges of the raisable pair of top panels, respectively.

13. The foldable holding device according to claim 11, wherein the raised-position support components are flexible fabric components, and
the pair of side panels are foldably connected to at least one of the side edges of the raisable pair of top panels by the flexible fabric components.

14. The foldable holding device according to claim 11, wherein the raised-position support components are flexible plastic components, and
the pair of side panels are foldably connected to at least one of the side edges of the raisable pair of top panels by the flexible plastic components.

* * * * *